US00RE47395E

(19) United States
(12) Reissued Patent
Oldknow et al.

(10) Patent Number: US RE47,395 E
(45) Date of Reissued Patent: May 21, 2019

(54) OPTIMIZING RAIL TRACK PERFORMANCE

(71) Applicant: L.B. Foster Rail Technologies Canada, Ltd., Burnaby (CA)

(72) Inventors: Kevin Oldknow, North Vancouver (CA); John Samuels, Palm Beach Gardens, FL (US); Donald Thomas Eadie, Vancouver (CA); Dana Earl, Columbus, OH (US)

(73) Assignee: L.B. Foster Rail Technologies Canada, Ltd., British Columbia (CA)

(21) Appl. No.: 14/750,909

(22) Filed: Jun. 25, 2015

Related U.S. Patent Documents

Reissue of:
(64) Patent No.: 8,473,128
Issued: Jun. 25, 2013
Appl. No.: 13/293,805
Filed: Nov. 10, 2011

U.S. Applications:
(63) Continuation of application No. PCT/CA2011/000595, filed on May 19, 2011.

(60) Provisional application No. 61/395,935, filed on May 19, 2010.

(51) Int. Cl.
*B61K 3/00* (2006.01)
*B61K 9/08* (2006.01)

(52) U.S. Cl.
CPC . *B61K 3/00* (2013.01); *B61K 9/08* (2013.01)

(58) Field of Classification Search
None
See application file for complete search history.

(56) References Cited

U.S. PATENT DOCUMENTS 3,638,482 A * 2/1972 Schubert ..... B61K 9/08 73/146
3,869,907 A * 3/1975 Plasser ..... B61K 9/08 33/338
3,992,935 A * 11/1976 Schubert ..... B61K 9/08 73/146
5,492,642 A 2/1996 Mulvihill et al.
5,641,037 A 6/1997 Wise et al.
(Continued)

FOREIGN PATENT DOCUMENTS

CA 2321507 A1 3/2002
EP 1357175 A1 10/2003
(Continued)

OTHER PUBLICATIONS

Office Action for U.S. Appl. No. 13/293,805 dated Sep. 27, 2012.
(Continued)

*Primary Examiner* — Nick Corsaro
(74) *Attorney, Agent, or Firm* — Honigman LLP

(57) ABSTRACT

A method for optimizing track performance is provided. The method involves measuring one or more track status data at one or more measurement sites of the track during a train pass through the one or more measurement sites. Followed by analyzing the one or more track status data against one or more baseline reference values to obtain a track status profile, and adjusting an operating parameter, a track parameter, or both the operating and track parameters, based on the track status profile, to optimize the track's performance.

16 Claims, 5 Drawing Sheets

(56) References Cited

U.S. PATENT DOCUMENTS

| | | | | |
|---|---|---|---|---|
| 5,956,664 | A * | 9/1999 | Bryan | B61L 23/044 340/870.16 |
| 6,135,767 | A | 10/2000 | Kesling | |
| 6,387,854 | B1 | 5/2002 | Sedelmeier et al. | |
| 6,446,754 | B1 | 9/2002 | Kostelny-Vogts et al. | |
| 6,719,095 | B2 | 4/2004 | Arens et al. | |
| 6,795,372 | B2 | 9/2004 | Kim et al. | |
| 6,854,563 | B2 | 2/2005 | Kumar et al. | |
| 6,991,065 | B2 * | 1/2006 | Leslie et al. | 184/2 |
| 7,096,997 | B2 | 8/2006 | Appleby et al. | |
| 7,164,975 | B2 * | 1/2007 | Bidaud | 701/19 |
| 7,244,695 | B2 | 7/2007 | Eadie | |
| 7,357,427 | B2 | 4/2008 | Eadie et al. | |
| 7,392,117 | B1 * | 6/2008 | Bilodeau | B61L 23/042 246/120 |
| 7,784,840 | B2 | 8/2010 | Leslie | |
| 8,180,590 | B2 | 5/2012 | Szwilski et al. | |
| 8,264,330 | B2 * | 9/2012 | Yeldell et al. | 340/10.1 |
| 2003/0195123 | A1 | 10/2003 | Cotter | |
| 2004/0038831 | A1 | 2/2004 | Eadie | |
| 2008/0203735 | A1 | 8/2008 | Leslie | B61K 3/00 291/3 |
| 2012/0274772 | A1 | 11/2012 | Fosburgh et al. | |
| 2013/0233649 | A1 | 9/2013 | Appleby et al. | |

FOREIGN PATENT DOCUMENTS

| | | | |
|---|---|---|---|
| EP | 1418222 | A2 | 5/2004 |
| GB | 2405910 | B | 4/2006 |
| WO | WO-9813445 | A1 | 4/1998 |
| WO | WO-0226919 | A2 | 4/2002 |
| WO | WO-03099449 | A1 | 12/2003 |
| WO | WO-03106240 | A1 | 12/2003 |
| WO | WO-2004096960 | A1 | 11/2004 |
| WO | WO-2006000094 | A1 | 1/2006 |
| WO | WO-2011143765 | A1 | 11/2011 |

OTHER PUBLICATIONS

Eadie, D., et al. The Effects of Top of Rail Friction Modifier on Wear and Rolling Contact Fatigue: Full Scale Rail-Wheel Test Rig Evaluation, Analysis and Modeling, 7th International Conference on Contact Mechanics and Wear of Rail/Wheel Systems (CM2006), Brisbane, Australia, Sep. 24-26, 2006, 9pp.

International Search Report for PCT/CA2011/000595 dated Aug. 29, 2011.

Cotter, J., et. al. Top of Rail Friction Control: Reductions in Fuel and Greenhouse Gas Emissions, Proceedings of the IHHA Conference, Rio de Janeiro, Brazil, Jun. 2005, 7pp.

Eadie, D., et. al. Implementation of Wayside Top of Rail Friction Control on North American Heavy Haul Freight Railways, Proceedings of the World Congress on Railway Research, Montreal, Quebec, Jun. 2006, 10pp.

Mcguire, B., et al. Using Wayside Load Detectors for Preventive Vehicle Maintenance. Interface, The J. of Wheel/Rail Interaction, Apr. 2007, 14pp.

Reiff, R., 2007, Top of Rail Friction Control on Rail Surface Performance and Grinding, TTCI Technology Digest TD-07-039, Nov. 2007, 4pp.

Reiff, R., Mobile-based Car Mounted Top of Rail Friction Control Application Issues—Effectiveness and Deployment, TTCI Technology Digest TD-08-039, Oct. 2008, 4pp.

Roney, M., et al. Implementation of Distributed Power and Friction Control to Minimize the Stress State and Maximize Velocity in Canadian Pacific's Heavy Haul/Heavy Grade Train operations. 2010, Journal of Rail and Rapid Transit, 224:F5, pp. 465-471.

International Search Report for PCT/CA2012/001040 dated Feb. 14, 2013.

* cited by examiner

OPTIMIZING RAIL TRACK PERFORMANCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This application] *This U.S. patent application is a Reissue Application of U.S. Ser. No. 13/293,805 filed Nov. 10, 2011, now U.S. Pat. No. 8,473,128 granted Jun. 25, 2013 which* is a continuation of PCT Application Serial No. PCT/CA2011/000595, filed May 19, 2011, which claims the priority of U.S. Provisional Application No. 61/395,935, filed May 19, 2010, both of which are incorporated herein by reference in their entirety.

FIELD OF INVENTION

This invention relates to optimizing rail track performance. More specifically, this invention provides a system, method and device to acquire and evaluate rail track status, determine a track status profile, and adjust track and operating parameters to optimize rail track performance.

BACKGROUND OF THE INVENTION

Stresses in rail track structures arise from various causes including changes of temperature, wheel/rail loads, changes in wheel/rail friction conditions during use. Contact stresses between wheel and rail are influential in determining rates of wheel and rail wear, track structure degradation and the initiation and growth of rolling contact fatigue cracks.

There are a number of key factors that play significant roles in determining the magnitudes of stresses occurring between wheel and rail, particularly when rail vehicles are negotiating curved track. These include rail vehicle weights and steering characteristics, train lengths, track gradient and curvature, as well as the state of friction between wheel and rail surfaces and the relationships between train speed, track geometry, and the distribution of locomotive power along the length of the train.

Included in the parameters associated with track geometry is so-called superelevation (or cant). Superelevation is introduced in curves to counteract the centrifugal force that is generated when a rail vehicle negotiates a curve of a given radius at a given speed. The theoretical speed at which this centrifugal force is perfectly balanced for a single wheelset negotiating a curve of specific radius and superelevation is referred to as the balance speed for the curve. Balance speed is an important concept in railway operations due to the fact that vehicles travelling significantly above balance speed in a curve face an increased probability of derailment while vehicles travelling significantly below balance speed can impart dramatically increased and (in the case of heavy axle load vehicles) destructive forces on the track structure.

Track design and (in many cases) ongoing maintenance involves specifying and establishing a specific superelevation for each curve in a track segment. The permissible operating speed in a given segment can be referred to as the posted speed. Rather than setting superelevation in each curve such that the balance speed is equal to the posted speed, the typical approach is to specify a lesser degree of superelevation so that the balance speed is a prescribed amount lower than the posted speed. While this is believed to improve vehicle steering at posted speed, the primary purpose is to accommodate a realistic distribution of speeds over a given track segment that will actually be lower than the posted speed.

Optimizing any strategy for specifying, establishing and maintaining superelevation in a curve therefore depends explicitly on accurate knowledge of the distribution of vehicle speeds for given train types operating in the curve. This information is often largely unknown or uncertain, and can vary significantly over time with changing traffic types and conditions. This can result in accelerated and unnecessary wear and track structure degradation when a curve is maintained with a degree of superelevation that is not matched to the realistic distribution of vehicle speeds.

SUMMARY OF THE INVENTION

This invention relates to optimizing rail track performance. More specifically, this invention provides a system, method and device to acquire and evaluate rail track status, determine a track status profile, and adjust track parameters or an operating parameter to optimize rail track performance.

The present invention provides a method for optimizing track performance, including curve track performance, comprising, measuring one or more track status data at one or more measurement sites of the track during a train pass through the one or more measurement sites, analyzing the one or more track status data against one or more baseline reference values to obtain a track status profile, and adjusting an operating parameter, a track parameter, or both the operating and track parameters, based on the track status profile, to optimize the track's performance.

The present invention pertains to the methods described above, wherein in the step of adjusting, the operating parameter, a track parameter, or both the operating and track parameters, comprises modulating geometry of the track, modulating superelevation of the track, modulating lubrication status of the track, modulating train operating speed, modulating distributed power of the train, or a combination thereof. Furthermore, in the step of measuring, the track status data may comprise one or more data selected from the group: a lateral force, a vertical force, a lateral/vertical force ratio, train identification, train speed, train acceleration, train deceleration, rail stress, wheel/rail interface friction, track lubrication status, temperature, precipitation, acceleration, vibration, distributed power identification, axel load, or a combination thereof.

The present invention pertains to the methods described above, wherein in the step of analyzing, the baseline reference values comprises maximum speed, superelevation of a curve, traffic distribution, lubrication and friction modification of the curve rail, or a combination thereof. The traffic distribution may comprise speed, velocity, direction, axle load or a combination thereof.

The present invention also provides a system for determining a status profile of a track comprising, a data measuring device comprising one or more measuring modules comprising at least one sensor for measuring track status data at one or more measuring sites, the data measuring device operatively connected with a data analyzing module for determining a track status profile by comparing the track status data to baseline reference values. The track status data may be transmitted to the data analyzing module via wire, or wirelessly. For example, the system may comprise a curve optimizer analysis module for determining the optimal curve operating profile of a track.

The present invention relates to a system as described above, wherein the data analyzing module comprises an out-put module. The out-put module displays data (curve optimization metrics) comprising lubrication status, lateral force distribution, comparison of curve design superelevation to optimal superelevation and/or actual superelevation, comparison of actual train speed to design train speed, axle load distribution, distributed power configuration, detected geometry shift or a combination thereof. The system may further communicate with, or comprise, a lubrication module.

The present invention also provides a device for measuring track status data at a track site comprising, a measuring module comprising at least one sensor for measuring track status, and a module for transmitting the track status data to an analyzing module. The sensor may comprise a L/V sensor, a load cell, an accelerometer, a microphone, a closed-circuit television, a thermometer or a combination thereof.

The device of the present invention may be used to extend the asset life of curved track assets, including the rail, ties and fasteners along entry and exit spirals, the body of the curve, as well as straight stretches of track between one or more curves. The useful life of these track components is extended by lowering the stresses on the components within the section of curved track utilizing real time data collection of curving forces and adjusting one or more than one rail parameter, for example, gauge face lubrication, top of rail lubrication, or both gauge face and top of rail lubrication, superelevation of the section of track, train speed through the section of track, to minimize curving forces. The device as described herein incorporates one or more computer algorithms to compare the railroad track or curve design parameters with actual train operating conditions to create conditions for example that minimize curving forces. The device may also generate a report for each section of track or curve along a rail track. The design parameters and train operating conditions to be considered, and the report, may include information pertaining to one or more of the following:

performance of friction management systems, for example, performance of a top of rail lubrication system, a gauge face lubricant system, or both the top of rail and the gauge face lubricant system positioned within the section of track being monitored;

status of a friction management system that adjusts the delivery of a composition, for example a lubricant or friction control composition, from one or more friction management systems located along the section of track, based on data obtained from the section of track in real-time, for example before, during, and after, a train pass along the section of track being monitored. The adjustment of the delivery of the composition minimizes train forces, track forces, or both train and track forces, along a section of the track being monitored and treated. For example, the amount of composition applied may be varied during a train pass, the location of composition application, either top of rail, gauge face, or both, may be varied during a train pass, or the type of composition applied at a location, for example, a lubricant, or friction modifier composition, may be varied during a train pass, or a combination thereof;

if desired a report of the lateral force distributions for either rail, or both rails, on the curve of the section of track, and axle loads distributions of the train during a pass of the section of track being monitored may be obtained;

if desired a comparison of the current curve design superelevation, to an optimized superelevation, that incorporates and accounts for one or more performance criteria, for example but not limited to reduced L/V forces, determined from the measured data during a train pass, may be generated. This data may be used to recommend modifications to the curve design in order to optimize superelevation at the monitored site;

determination of an appropriate train speed for a given train type through the section of track being monitored to minimize stress of the track components, including rail, ties and fasteners. Based on the monitored data along the section of track, for example but not limited to L/V forces, train speed and train type, the actual train speed of a train of known train type may be compared to an optimal train speed for the same train type, and an appropriate train speed for the train type, for a section of track being monitored may be determined.

This invention relates to optimizing rail track performance on curves, including entry spirals, main curve body and exit spirals. This invention provides a system, method and devices to acquire and evaluate rail track status in real time, determine the optimum track profile profile, and adjust track friction conditions and operating parameters in order to optimize rail track performance. By optimizing track performance as described herein, the asset life of components of a train, for example the wheel, and running gear of railcars may also be extended.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 1 shows an overview of the track optimizer of the present invention.

DETAILED DESCRIPTION

Figure 1A:
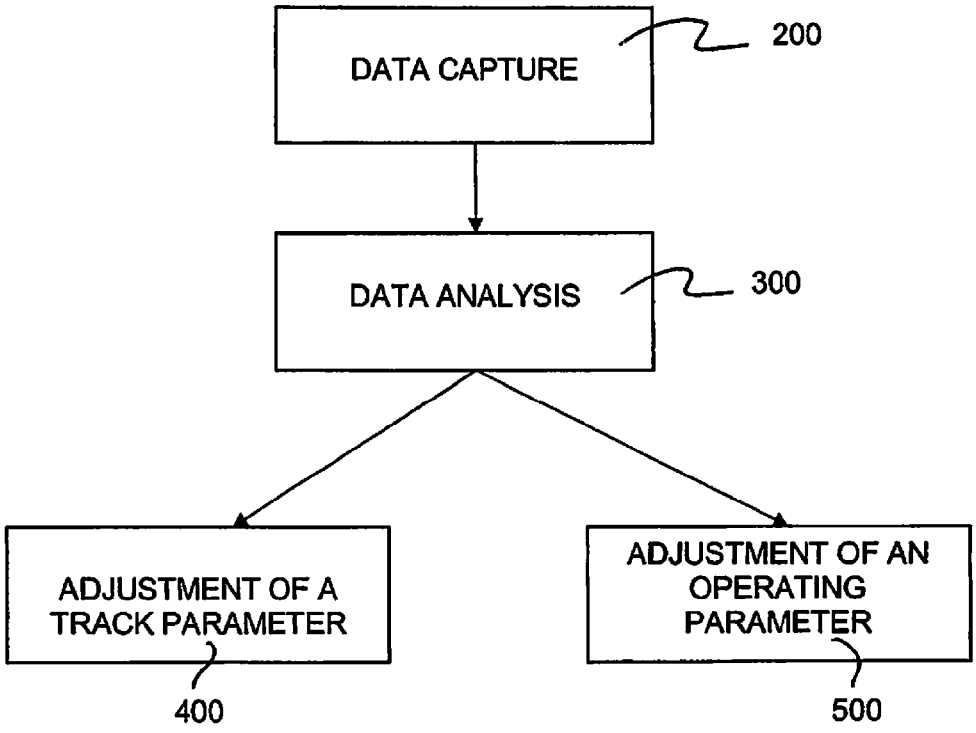
FIG. 1A shows the general process.

This invention relates to optimizing rail track performance. More specifically, this invention provides a method, a system and a device to acquire and evaluate rail track status, determine a track status profile. The information may be used to adjust track and operating parameters to optimize rail track performance, and to extend the asset life of components within a section of track, including the rail, ties and fasteners, and optionally rail wheels.

The present invention provides a method for optimizing rail track performance by measuring track status data (200, FIG. 1) in a given territory or section of track, and analyzing the data (300) to determine a track status profile. Based on the track status profile, one or more than one performance parameter, such as an operating parameter (500), a track parameter (400), or an operating parameter and track parameter, may be adjusted, to optimize rail track performance.

A track parameter may include, but is not limited to, track geometry, track superelevation, friction management protocol, or a combination thereof.

An operating parameter may include but is not limited to a distributed power configuration along a train consist, an axle load of one or more train cars, train speed though the section of track, or a combination thereof.

The present invention also provides a device for measuring track status data, and a system for determining a track status profile. The track status data, and the track status profile may be used to optimize rail track performance.

By the term "track" is meant a rail track and includes a curved track section (curve), a straight track section, or a track section that comprises a junction or a switch. A section of track is a portion of track of a fixed distance over which a train may pass, and which be monitored, and as required, optimized as described herein. A section of track may comprise one or more than one track feature, for example a section of track may comprise one or more than one curve, valley, hill and straight portion. A section of track may include a curve, a portion of track leading into the curve or entry spiral, a portion of track exiting the curve or exit spiral, or a combination of the portion of track including the entry spiral the exit spiral, and the body of the curve. A section of track may also include a portion of track that includes a junction or switch, a portion of track leading into the junction or switch, a portion of track exiting the junction or switch, or a combination of the portion of track leading into the junction or switch, the junction or switch, and the exit portion of track. A section of track may also comprise a portion of track that is straight or curved, over which there is a change in elevation, for example a portion of track leading into, exiting from, and spanning a dip or valley, or a portion of track leading in to, exiting from, and spanning a crest or hill. A section of track may include a plurality of track features described above (curve, hill and valley sections) over a predetermined distance, and for which track optimization is desired. For example, a section of track may include a distance of 0.1 to 500 km, or any amount therebetween. Furthermore, one section of track may be contiguous with a second section of track, each section of track monitored separately and optimized independently. For example, two curved section of tracks that are contiguous may be monitored and modified separately. Alternatively, a first section of track that is monitored and optimized as described herein, may be discrete and separate from, a second section of track that is monitored and modified or optimized using the methods described herein, and the first and second sections of track may be separated by a length of intervening track that is not being monitored.

Figure 1B:
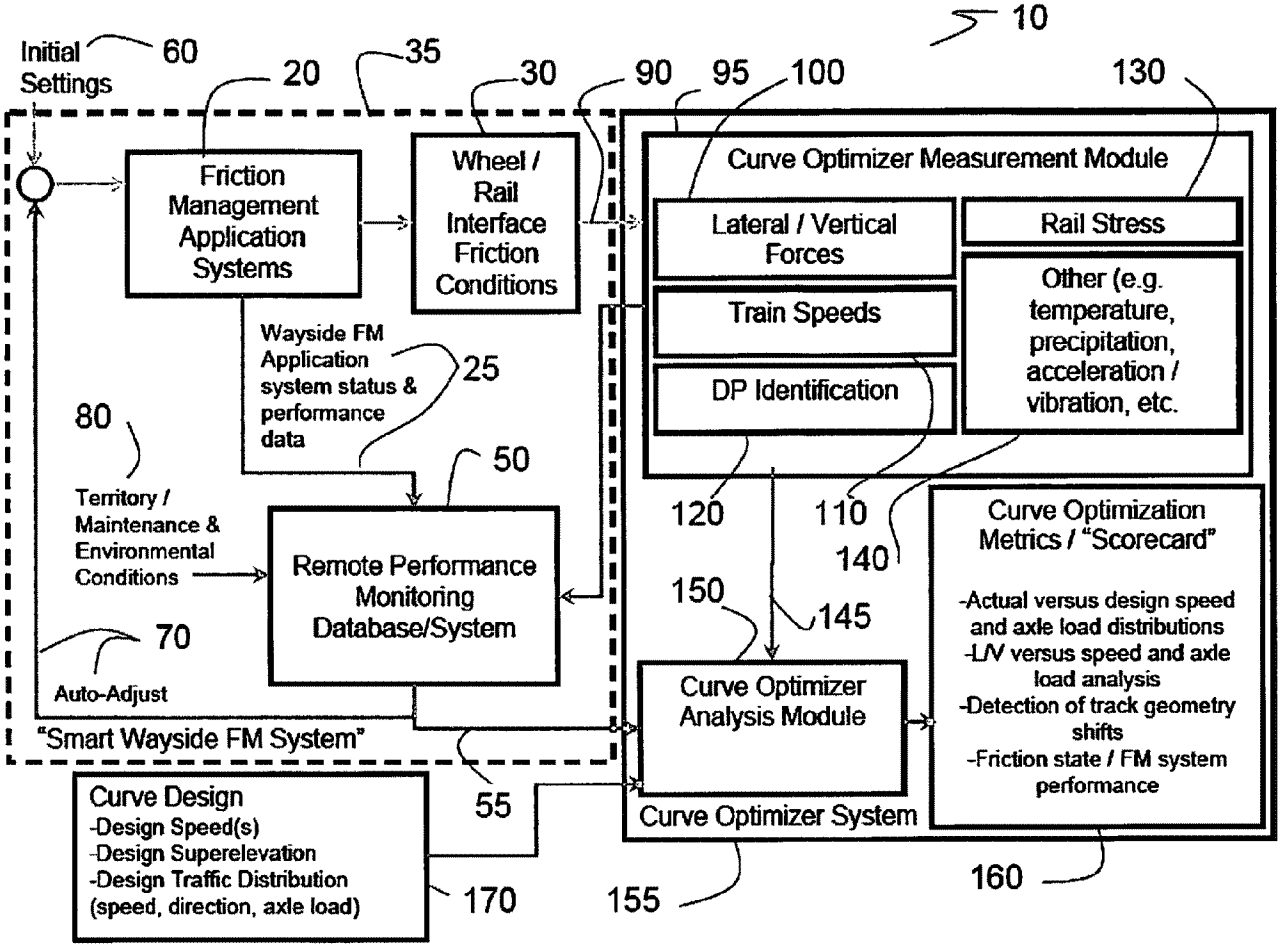
FIG. 1B shows a block diagram of the relationship of factors involved in optimizing track performance and the flow of information and control actions in determining track performance and territory conditions, and adjusting track parameters correspondingly.

With reference to FIGS. 1A and 1B there is shown an overview of the system, also called an adaptive control system (10), and performance parameters, for example but not limited to friction management system (application system: 20; wayside friction management system: 35), that may be monitored and adjusted using system (10). In general terms, the system, for example an adaptive control system (10) obtains data (200) from a section of track, including, for example initial settings (60, and/or curve design; 170), geographical, maintenance, or environmental conditions (territory maintenance and environmental conditions: 80; and/or temperature, precipitation, acceleration, vibration: 140), data from sensors (95, 100, 110, 120, 130, 140), data of wheel/rail interface (30, 100) and data from friction management systems (application system: 20; application system status and performance: 25), to produce one or more outputs (via 25, 55, 90; 145) that is analyzed (data analysis: 300), for example by a remote performance monitoring database/system (50; 500), and/or a curve optimizer analysis module (150) to produce a curve optimization metric s/scorecard (160). If desired this data may be compared to the initial settings (60, 170). Based on the data collected, adjustments (70) to an operating parameter (500), for example but not limited to friction management (35) or a track parameter (400), for example but not limited to curve design (170), are made in order to optimize track performance.

By optimizing track performance, it is meant extending the life of components along a section of track, including the rail, ties and fasteners, and in some cases extending the life of components, for example the wheels, on a train passing through the section of track. Optimizing track performance may also reduce energy consumption of the train passing through the section of track.

Optimizing track performance involves monitoring one or more than one performance parameter, for example an operating parameter, a track parameter, or a combination thereof, and as required modifying a component along the section of track or modifying the train configuration of a train passing through the section of track. Non-limiting examples of components that may be monitored and modified in order to optimize track performance include one or more friction management systems (20, 25) located along the section of track being monitored, superelevation of the section of track (170, 150), power distribution and/or speed of the train (e.g. 30, 90), or a combination thereof.

Figure 2:
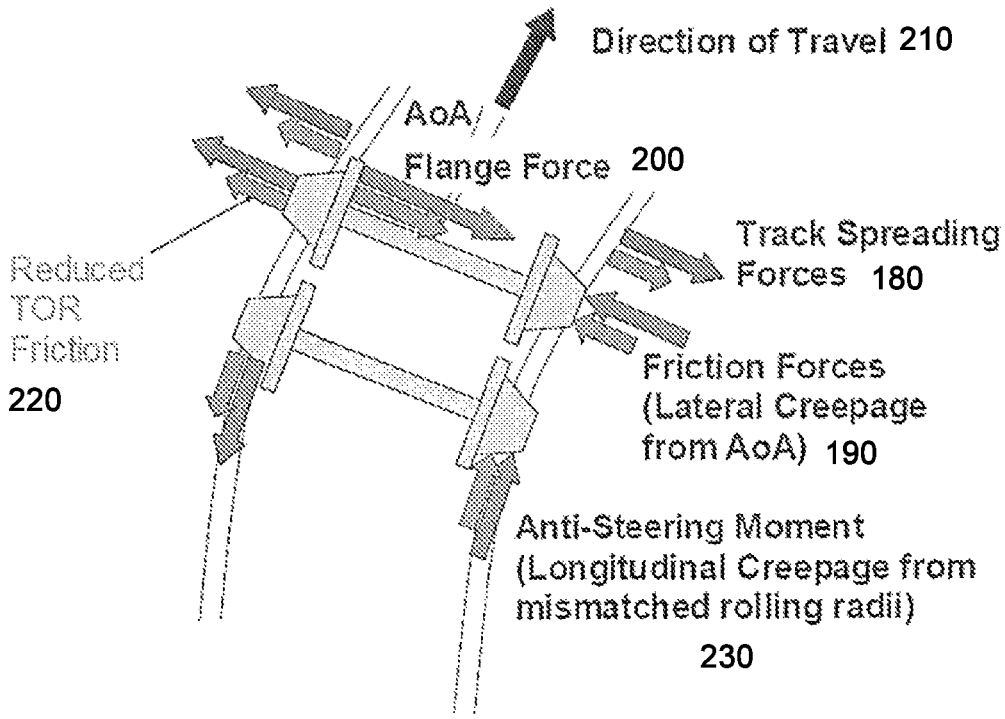
FIG. 2 shows the interaction between top of rail (TOR)/wheel tread friction levels and track spreading forces.

Friction Management is the process of controlling the frictional properties at the rail/wheel contact to values that are most appropriate for the particular operating conditions (Eadie, D., et. al., Implementation of Wayside Top of Rail Friction Control on North American Heavy Haul Freight Railways, Proceedings of the World Congress on Railway Research, Montreal, Quebec, June 2006, 10 pp). The friction management system (20, 25, 35) may include for example, a top of rail lubrication system, a gauge face lubricant system, or both the top of rail and the gauge face lubricant system. Such systems are known the in the art as described in WO 2006/000094, WO 2004/096960, WO 2002/26919, WO 03/099449 (which are incorporated herein by reference). A trackside application systems may be obtained for example from Portec Rail (e.g. PROTECTOR™ IV, dispensing KELTRACK® Trackside Freight friction modifier). The adaptive control system (10), operatively connected with a friction management system (20, 35) may be used to adjust the delivery of a composition, for example a lubricant or friction control composition, from one or more friction management delivery systems located along the section of track, based on data obtained from the section of track in real-time, for example before, during, and after, a train pass along the section of track monitored. The adjustment of the delivery of the composition minimizes train forces (for example flange force 200; and friction forces 190; FIG. 2), track forces (for example track spreading forces 180), or both train and track forces, along a section of the track being monitored and treated. For example, the amount of lubricant or friction control composition applied may be varied during a train pass, the location of composition application, either top of rail, gauge face, or both, may be varied during a train pass, or the type of composition applied at a location, for example, a lubricant, or friction modifier composition, may be varied during a train pass, or a combination thereof.

The adaptive control system (10) may also generate one or more reports (160) of the lateral force distributions (e.g. 100) for either the high or low rail, or both rails, on the curve of the section of track, and axle loads distributions of the train during a pass of the section of track being monitored. The control system may also compare the current curve design superelevation (170), to an optimized superelevation, that incorporates and accounts for one or more performance criteria, for example but not limited to L/V forces (100), determined from the measured data during a train pass. This data may then be used to design an optimized curve design superelevation.

Furthermore, the control system may determine an appropriate train speed for a given train type through the section of track being monitored to minimize stress of the track components, including rail, ties and fasteners. Based on the monitored data along the section of track, for example but not limited to L/V forces, train speed and train type, the actual train speed of a train of known train type may be compared to an optimal train speed for the same train type, and an appropriate train speed for the train type, for a section of track being monitored may be established.

By optimizing track performance one or more than one of the following outcomes may be realized: reduced track wear, reduced wheel wear, reduced wheel squeal, reduced track vibration, reduced energy requirements of a train to traverse the section of track, adjusting the power distribution within a train consist for navigating sections of track, when compared to the same section of track, and a similar train navigating the same section of track without modifying the performance parameter.

The present invention therefore provides a method for optimizing track performance, typically along a section of track, comprising measuring one or more than one track status data, at one or more than one measurement site along the track or section of track, and comparing the track status with one or more than one baseline reference value, to obtain a track status profile. Adjusting an operating parameter, track parameter or a combination of both the operating parameter and the track parameter, based on the track status profile to optimize a track's performance. These steps may be repeated in order to optimize the track's performance.

The present invention also provides to a device for measuring track status data at one or more measuring sites along one or more than one section of track. The data measuring device may include for example an optimizer measurement module (95; FIG. 1B) comprising one or more than one of sensor from the group of: an L/V sensor (100), a train speed sensor (110), a train identifier, a distributed power (DP) identifier (120), a rail stress sensor (130), a pressure sensor, a temperature sensor (140), a precipitation sensor (140), an acceleration sensor (140), a vibration sensor (140), an audio sensor, and a sensor of wheel/rail interface friction conditions (30). The data measuring device may also include a module that obtains information about the friction management systems status (25).

An optimizer system, for example a curve optimizer system (155; FIG. 1B), may comprise the optimizer measurement module (95) and an optimizer analysis module (150). The optimizer analysis module may receive data from the measurement module (95), a design module (170) and the friction management system (35). The optimizer system is capable of analyzing the data obtained via one or more measurement or data modules, to produce an output for example, a scorecard (160). The output may also be used to adjust a track, an operating, or both a track and an operating parameter.

The measurement module (95), friction management system status module (35), or both may be used to measure and transmit track status data to one or more analyzing modules (150, 50) via wireless, or hard-wired, communications links, for example, a satellite system, a cellular network, an optical or infrared system, optic fiber or a hard-wire. The one or more analyzing modules may be remote from the one or more measuring sites, or it may be located at or near the one or more measurement sites. The one or more data measuring devices (35, 95) measure and record performance and status data in desired locations along a track, for example a curved track. The data measuring devices may be self-contained, and can be moved within a territory to different locations and/or sections of a track for data collection, or they may be installed as required at a specific location along a section of track for long term data collection at the site. For example, the friction management system (20, 35) may be permanently located at a measurement site and operatively connected with a lubrication and/or friction modifying composition application system (25).

The device (10) may also provide an output that is analyzed, for example using one or more analysis modules (150, 50). An output of the analysis modules may be used to generate a scorecard (160), optimize rail track performance (400, 500), or both generate the scorecard and optimize track performance. The analysis module may compare data gathered from the measurement module (95), and friction management system (35), with initial settings (60) and curve design parameters (170), and generate an output for example a scorecard (160) based on this comparison. The output may also be used to adjust an operating parameter (400, 500) to optimize track performance.

For example which is not to be considered limiting, the output of the analysis of the device may be used to activate a friction management protocol (35) along one or more sections of track (i.e. a track parameter; 400) in real-time, during track use, to optimize rail track performance, the output may be used to modify the location of locomotives that navigate one or more sections of track (i.e. an operating parameter; 500) in order to optimize rail track performance, the output may be used to modify the superelevation of the track (i.e. a track parameter 400) to optimize rail track performance, or a combination thereof.

The data measuring device may comprise for example a lateral/vertical (L/V) sensor (100) which detects L/V force ratios. When a train moves through a curve, lateral forces are applied to the track. The L/V force that is applied to the track, or each of the high or low rails of the track will vary, when the train is moving along a curve at a high speed when compared to movement at a lower speed (see for example FIGS. 3 and 4). In addition to L/V forces, other track status and train status data (30, 40) may be measured for example but not limited to, one or more audio sensors (140), vibration sensors (140), pressure sensors (140), temperature sensors (140), water sensors (140), video monitors, speed sensors (110), senores for detecting acceleration or de-acceleration of the train, and the like. These parameters may vary, for example with the train, train speed, power distribution, axle load, track geometry, and track lubrication. Examples of measureable parameters that may arise from a train passing over a section of track include but are not limited to, a vibration frequency of the track (140), for example a maximum vibration frequency detectable within the track, the audio frequency (the screech or absence thereof) of sound generated by the wheels moving along the track, rail stress (130), temperature of the track, train identity (120), train speed distribution, and the like. These physical reactions may be measured by the one or more than one sensors of the data measuring device.

Non-limiting examples of such sensors include a load cell for determining rail load, accelerometers for vibration, microphones for vibration; microphones for train noise, and an L/V sensor for lateral/vertical force ratios. Sensors for environmental factors might include a thermometer or temperature probe for air and/or track temperature, video or closed-circuit television (CCTV), for example to monitor precipitation and other visible factors for example, snow, fire, debris, track status and the like. The CCTV may also be used to monitor additional parameters as desired, for example but not limited to, train identification, distributed power (120), and train speed distribution (110). The sensors described above are independently available and may readily be obtained.

The measurement of L/V forces is used to monitor lateral/vertical distribution along a section of track. Speed feedback allows for the characterization of speed distributions at the measurement site, evaluation of impacts of track geometry and/or friction control effectiveness and corresponding track parameter adjustments. Monitoring of environmental factors such as weather allows for adjustment based on the influences of temperature, precipitation and other environmental factors on the track's performance. CCTV, video and/or photo capturing, allows for the evaluation of system status and performance and environmental factors, as well as potential damage to the track and/or the data measuring device. Acoustic feedback, allows for the evaluation of the performance of the track's geometry and/or detection of friction management system performance levels through identification of wheel squeal and flanging noise, as well as general wheel/rail interaction noise. Vibration feedback, allows for the evaluation of the performance of the track's geometry and/or detection of friction management system performance through the mechanical transmission of energy and corresponding adjustment of the track's parameter. Temperature feedback, allows for adjustment based on the influences of rail temperature, ambient temperatures and other temperature measurements.

Data from the data measuring device is collected, and may be stored and analyzed in a data analyzing module, for example a remote performance monitoring system (50), a curve optimizer analysis module (150), or both, with algorithms in place to compare the track status data with established threshold and baseline reference values as well as detect changes and trends in performance and status values. The analyzing module may be hosted on a computing system (e.g. server) with resident algorithms to process performance and status data.

The data analyzing module (50, 150) may include, or have access to a database that comprises baseline reference values, such as but not limited to, parameters of the curve design (170) such as design speed, curve superelevation or traffic distribution such as but not limited to speed, direction or axle load, power distribution.

The data analyzing module analyzes incoming status data and compares the data with the baseline reference values established for the specific track section to obtain a track status profile ('scorecard'; 160). Having evaluated the track status data in comparison to baseline reference value (e.g. 60) to obtain a track status profile, the status profile can be used to adjust a track parameter, an operating parameter, or both, to optimize the track's performance. Variation between the status data and the established baseline reference value may indicate that an operating parameter, track parameter or both are inadequate and identify low performance of the track. For example, if data from one or more measurement sites is significantly higher than baseline reference conditions or the status data from one or more measurement sites, and shows a significant change in average track status data versus data acquired at an earlier time point, then a track parameter, operating parameter or both might need adjusting. If for example lateral forces (or L/V force ratios) or other measured reactions show a significant increase in specific locations within a territory, it may be necessary to modulated a track parameter such as a track's geometry, for example the track's superelevation, at a given section of the track. As discussed above, in addition to a track's geometry lateral forces are influenced by train speed, axle load and distributed power. Therefore it might be necessary to adjust operating parameter such as train speed, distributed power, axle load and/or lubrication for the section to optimize the track's performance and to minimize lateral force and minimize wear of track assets.

When the measured status data falls within a baseline reference value, the track is presumed to have an adequate geometry with sufficient lubrication and no modification of the track segment is needed. Similarly, when the variation between the measured status data relating to the operating parameter falls within the baseline reference value, the train is presumed to have an appropriate power distribution, axle load and speed for the track segment.

The data analyzing module may further comprise an out-put module for the track status data and/or track status profile. The out-put module may have an operator interface. Track status profile that might be displayed may comprise information regarding performance of the lubrication/friction composition, system, the lateral force distribution, comparison of the curve design superelevation to an optimal superelevation and/or actual superelavation, comparison of the actual train speed to the design train speed, axle load distribution, distributed power configuration, detected geometry shift or a combination thereof.

The data analyzing module (150, 50) may be at a remote location from the data measuring device (95 25),or it might located within the data measuring device (e.g. 155).

The present invention further relates to a system (155) for determining a status profile of a track. The system comprises a measuring device as descried above, for example one or more measurement modules (25, 95), that measures and transmits the track status data to the data analyzing module (150). The data analyzing module determines a track status profile (160) by comparing the track status data to baseline reference values (170). The status profile might be used to optimize operating parameters, track parameters or both. Optionally a lubricating module (35) might be included in the system. Alternatively, the optimizer system (155) may be modular and interface with a separate friction management system (35). If the optimizer system interfaces with the friction management system, then the system may include the optimizer system (155; FIG. 1B) and associated components, and a friction management system (35; FIG. 1B) and associated components.

The present invention further relates to a method for reducing lateral force on a track comprising measuring one or more track status data at one or more measurement sites of the track and comparing the track status with one or more baseline reference values to obtain a track status profile. Based on this track status profile, an operating parameter, track parameter or a combination of both, may be adjusted to reduce lateral force on a track.

EXAMPLES

Friction Management

Friction Management is the process of controlling the frictional properties at the rail/wheel contact to values that are most appropriate for the particular operating conditions (Eadie, D., et. al. 2006, Implementation of Wayside Top of Rail Friction Control on North American Heavy Haul Freight Railways, Proceedings of the World Congress on Railway Research, Montreal, Quebec, June 2006, 10 pp).

In general terms, the objectives are:

- Lubrication of the gauge face of the rail to minimise friction, wear and curving resistance (μ between 0.1 and 0.25).
- Provide an intermediate friction coefficient (μ between 0.30 and 0.35) at the top of the rail, to control lateral forces in curves and rolling resistance in both curved and tangent track, targeting nominally a 30% reduction. A special class of products is generally required to achieve the intermediate friction conditions; lubricants are generally not suitable since they compromise locomotive traction and safe braking of trains.
- Ensure that friction levels on the top of the rails are high enough to provide design adhesion levels under wheel rolling/sliding conditions.
- Achieve fuel consumption and emissions reductions through better control of those components of train resistance that are related to wheel/rail friction and steering.

Gauge face lubricators were positioned to achieve control of rail gauge face curve wear, while piloting top-of-rail (TOR) friction modifiers. Large scale installation of wayside TOR units dispensing KELTRACK® friction modifier (available from Kelsan Technologies, Vancouver) to passing wheels was also employed.

Implementation of gauge face lubrication using application equipment and premium rail curve grease demonstrated substantial reductions in gauge face rail wear and projected locomotive fuel consumption (approximately 87% and 6%, respectively), and established optimal lubricator spacing and application rates in a corridor.

The introduction of TOR friction control plays a complementary role to gauge face lubrication, reducing lateral loads, track structure degradation, rail/wheel wear, energy consumption, rolling contact fatigue and associated maintenance and grinding operations (compared with gauge face lubrication alone). By reducing friction at the TOR/wheel tread interface to an intermediate level, vehicle steering in sharp curves is improved through reductions in lateral friction forces at the leading axle and longitudinal friction forces at the trailing axle (both of which produce anti-steering moments in sharp curves). This reduction in friction forces tends to reduce track spreading loads and corresponding track structure degradation (Eadie, D., et. al. Implementation of Wayside Top of Rail Friction Control on North American Heavy Haul Freight Railways, Proceedings of the World Congress on Railway Research, Montreal, Quebec, June 2006, 10 pp).

In addition, the reduction in coefficient of friction produces a simultaneous corresponding reduction in the propensity for wear and development of rolling contact fatigue (Eadie, D., et. al. The Effects of Top of Rail Friction Modifier on Wear and Rolling Contact Fatigue: Full Scale Rail-Wheel Test Rig Evaluation, Analysis and Modelling, 7th International Conference on Contact Mechanics and Wear of Rail/Wheel Systems (CM2006), Brisbane, Australia, Sep. 24-26, 2006, 9 pp), resulting in a reduction in required grinding effort for a given accumulated tonnage (Reiff, R., 2007, Top of Rail Friction Control on Rail Surface Performance and Grinding, TTCI Technology Digest TD-07-039, November 2007, 4 pp). Reductions in energy and corresponding locomotive fuel consumption have been documented in both curved and tangent track (Cotter, J., et. al. Top of Rail Friction Control: Reductions in Fuel and Greenhouse Gas Emissions, Proceedings of the IHHA Conference, Rio de Janeiro, Brazil, June 2005, 7 pp; Reiff, R., Mobile-based Car Mounted Top of Rail Friction Control Application Issues—Effectiveness and Deployment, TTCI Technology Digest TD-08-039, October 2008, 4 pp).

TOR friction control offers a complementary technology to the implementation of distributed power and optimized with effective distributed power and optimized superelevation providing gains in the areas of train speed, efficiency, in-train forces and lateral loads, and TOR friction control providing further improvements in vehicle steering, track structure degradation, rolling contact fatigue development and energy consumption. The net result is a systems based approach to minimizing the stress state and maximizing velocity, which takes into account phenomena occurring at the scales of the territory, the train, the vehicle and the wheel rail interface.

Deployment of TOR friction control demonstrated lateral force reductions of 20-40%, rail wear reductions of approximately 50%, and projected fuel savings conservatively estimated at 3-4%. These benefits were subsequently monitored in continuous service over an approximate two-year period, demonstrating the economic return associated with asset life extension and reductions in both maintenance and fuel consumption.

TOR friction control was achieved through the deployment of Portec Rail PROTECTOR™ IV trackside application systems, dispensing KELTRACK® Trackside Freight friction modifier. Spacing and placement of units, as well as application rates, was based on testing under a range of conditions.

In order to monitor characteristic changes in lateral forces and train speed, a strain gauge based lateral/vertical (L/V) measurement system was installed in a 300 m (6 deg) curve at km 5.7 (mileage 3.55) on the South Track in the CP Shuswap Subdivision, west of Revelstoke, BC. At this location, loaded westbound trains negotiate a steady 1% ascending grade, resulting in sustained locomotive operation near peak adhesion and train speeds well below the so-called balance speed that was described above (superelevation in this curve is set for a posted speed of 56 kph). Under these conditions it is possible to clearly see the impacts of both distributed power and TOR friction control on lateral forces and train speed.

The L/V measurement system collects force measurements at a sampling rate of 500 Hz (with anti-aliasing filtering done at the 250 Hz), allowing for the detection of peak lateral and vertical loads associated with each axle pass. Multiple independent measurement cribs provide measurement redundancy, and provide the ability to determine train speed on an axle-by-axle basis.

In order to assess the impacts of distributed power on train speeds and lateral forces, data was collected from the L/V measurement site described above. Train identification data from a nearby Automatic Equipment Identification (AEI) tag reader was merged with the L/V database to allow for isolation of specific train types and distributed power configurations. While all relevant train series were monitored during this time, unit coal traffic provided the most direct comparison.

Coal traffic was divided into steel and aluminum car sets, with nominal train lengths during the test period of 115 and 124 cars for steel and aluminum sets, respectively. Each car had a nominal gross weight of 130,000 kg (286,000 lbs), resulting in an axle load of 32.5 tonnes. Distributed power configurations monitored during the period included head-mid-tail assignments of 2-0-1, 2-2-0 and 2-1-1, respectively. The 2-0-1 model represented CP's standard configuration prior to this work, with the 2-1-1 model representing the proposed optimum based on analysis using ASET software as described above.

Figure 3:
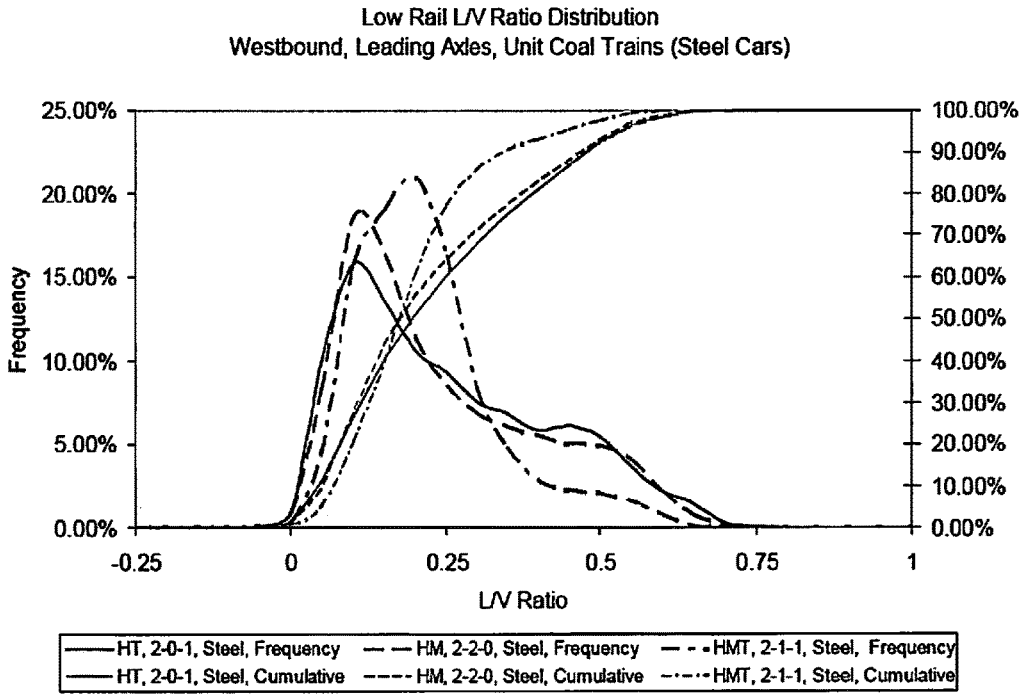
FIG. 3 shows low rail L/V distribution for unit coal trains (steel cars) in 2-0-1, 2-2-0 and 2-1-1 distributed power configurations during a test period.
Figure 4:
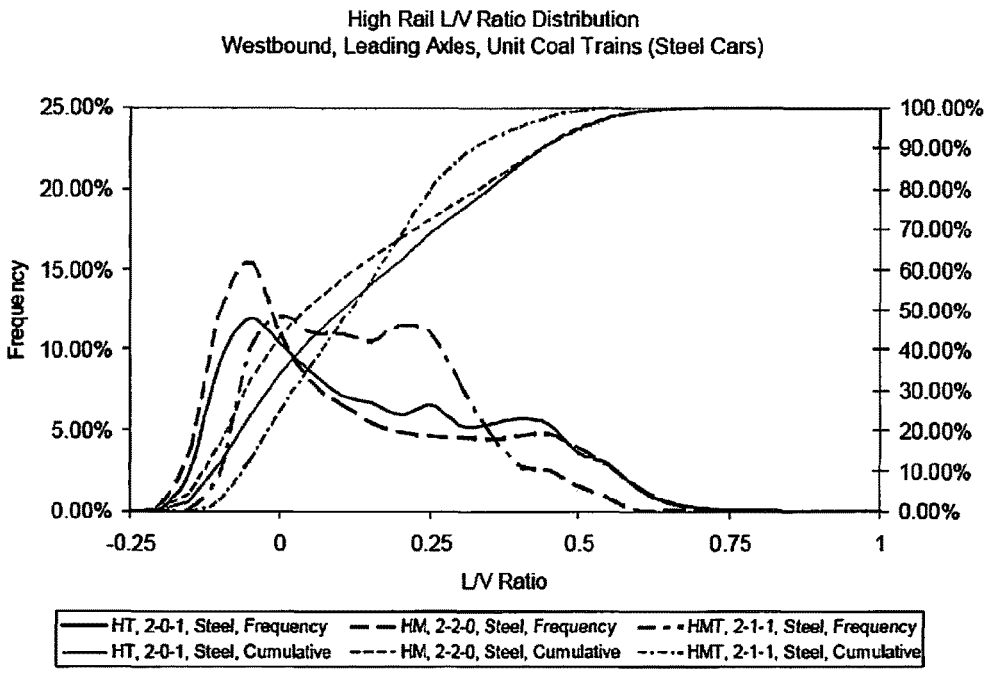
FIG. 4 shows high rail L/V distribution for unit coal trains (steel cars) in 2-0-1, 2-2-0 and 2-1-1 distributed power configurations during a test period.

As an illustration, FIGS. 3 and 4 show L/V ratio distributions for lead axles of unit coal trains (steel cars) in 2-0-1, 2-2-0 and 2-1-1 configurations during the test period. As shown, the 2-1-1 model produces a significant shift in L/V distribution, with a particular reduction in the frequency of high L/V values (corresponding to the most damaging forces from the standpoint of track structure degradation). Average values of lateral loads are summarized for both aluminum and steel cars in Table 1. As shown, the 2-1-1 model produced reductions in average low rail lateral forces of 9% and 17% for aluminum and steel cars (respectively) when compared with the 2-0-1 operating configuration, with significant reductions in the percentage of loads exceeding 45 kN.

TABLE 1

Average lateral loads for unit coal trains in 2-0-1, 2-2-0 and 2-1-1 distributed power configurations

| | Low Rail (kN) | High Rail (kN) | LR exceeding 45 kN (%) |
|---|---|---|---|
| 2-0-1 (Aluminum) | 39.0 | 16.2 | 33.1 |
| 2-2-0 (Aluminum) | 39.5 | 14.7 | 33.7 |
| 2-1-1 (Aluminum) | 35.4 | 17.5 | 26.1 |
| 2-0-1 (Steel) | 39.5 | 19.4 | 35.4 |
| 2-2-0 (Steel) | 37.8 | 16.1 | 31.9 |
| 2-1-1 (Steel) | 32.7 | 18.6 | 17.3 |

Table 2 summarizes coal train average speeds and shows a 30-35% increase in velocity associated with implementation of the 2-2-0 and 2-1-1 operating models (again in comparison with the 2-0-1 configuration). The impact of the fully distributed 2-1-1 model is further demonstrated by the reduction in lateral loads versus the 2-2-0 configuration (as shown in Table 1) despite equivalent nominal kW/Tonne values and nearly equivalent operating speeds.

TABLE 2

Average train speeds for unit coal trains in 2-0-1, 2-2-0 and 2-1-1 distributed power configurations

| | Mean Speed (kph) | Median Speed (kph) | Normal kW/Tonne |
|---|---|---|---|
| 2-0-1 (Aluminum) | 19.0 | 19.3 | 0.59 |
| 2-2-0 (Aluminum) | 25.3 | 25.4 | 0.78 |
| 2-1-1 (Aluminum) | 24.2 | 25.0 | 0.78 |
| 2-0-1 (Steel) | 20.3 | 20.9 | 0.63 |
| 2-2-0 (Steel) | 27.7 | 27.9 | 0.84 |
| 2-1-1 (Steel) | 27.4 | 27.2 | 0.84 |

In order to quantify the impacts of TOR friction control (in conjunction with distributed power) on lateral loads, a subsequent monitoring period was held between Sep. 5, 2008 and Mar. 6, 2009.

Following completion of the distributed power test period described in the previous section, track maintenance work (re-gauging) was carried out in the test curve. The resulting corrected gauge and increased lateral stiffness of the track had the effect of changing baseline force levels.

Table 3 summarizes the results of lateral force monitoring during baseline (GF lubrication only) and TOR friction control test phases for the 2-1-0 and 2-1-1 models that were operated during the test period. Of particular note is the 2-1-1 aluminum car model (129 cars), which demonstrates the combined effects of the fully distributed optimum power model and TOR friction control. As shown, the implementation of TOR friction control produced a further reduction in low rail lateral forces of 30% with a substantial reduction in the percentage of forces exceeding 45 kN.

TABLE 3

Average lateral loads for unit coal trains before/after implementation of TOR Friction control

| | Low Rail (kN) | High Rail (kN) | LR exceeding 45 kN (%) |
|---|---|---|---|
| Baseline (GF Lubrication Only) | | | |
| 2-1-0 (Al, 124 cars) | 45.7 | 31.4 | 41.7 |
| 2-1-1 (Al, 129 cars) | 48.8 | 43.7 | 49.0 |
| 2-1-0 (St, 115 cars) | 38.6 | 30.4 | 32.5 |
| GF Lubrication + TOR Friction Control | | | |
| 2-1-0 (Al, 124 cars) | 36.3 | 19.4 | 25.6 |
| 2-1-1 (Al, 129 cars) | 34.3 | 33.9 | 25.2 |
| 2-1-0 (St, 115 cars) | 33.1 | 20.2 | 23.5 |

Distributed power, SE adjustment and friction control have been demonstrated as complementary technologies, with effective distributed power and optimized SE providing gains in the areas of train speed and lateral loads, and TOR friction control providing further improvements in vehicle steering and corresponding lateral loads.

The net result is a system based approach to minimizing the stress state and maximizing velocity in heavy haul operations, which takes into account phenomena occurring at the scales of the territory, the train, the vehicle and the wheel rail interface.

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A method for optimizing track performance comprising:

a) measuring one or more track status data at one or more *stationary* measurement sites of [the] *a* track *section* during a train pass through the one or more *stationary* measurement sites;

b) *receiving data on territory and maintenance conditions for the track section;*

*c*) analyzing the one or more track status data *and analyzing the data on territory and maintenance conditions* against one or more baseline reference values to obtain a track status profile; and

[c] *d*) adjusting an operating parameter, a track parameter, or both the operating and track parameters, based on the track status profile, to optimize the track's performance, wherein the track status data comprises *a lateral force and* one or more data selected from the group: train identification, train acceleration, train deceleration, [rail stress,] temperature, precipitation, acceleration, distributed power identification, axle load, or a combination thereof.

2. The method of claim 1, wherein in the step of adjusting, the operating parameter, a track parameter, or both the operating and track parameters, comprises lowering lateral/vertical forces, modulating geometry of the track, modulating superelevation of the track, modulating lubrication status of the track, modulating train operating speed, modulating distributed power of the train, or a combination thereof.

3. The method of claim 1, wherein the track status data further comprises one or more data selected from the group: [a lateral force,] a vertical force, a lateral/vertical force ratio, train speed, wheel/rail interface friction, track lubrication status, vibration, or a combination thereof.

4. The method of claim 1, wherein in the step of analyzing, the baseline reference values comprises maximum speed, superelevation of a curve, lubrication of the rail, friction modification of the rail, traffic distribution or a combination thereof.

5. The method of claim 4, wherein the traffic distribution comprises speed, velocity, direction, axle load or a combination thereof.

6. The method of claim 1, wherein the track is a curved track.

7. A system for determining a status profile of a track *section* comprising[.]*:* a data measuring device comprising one or more measuring modules comprising at least one sensor for measuring track status data at one or more *stationary* measuring sites[, the data measuring device operatively connected with]*; and* a data analyzing module *operatively connected to the data measuring device* for *receiving data on territory and maintenance conditions for the track section and* determining a track status profile by comparing the track status data *and the data on territory and maintenance conditions* to baseline reference values, wherein the track status data comprises *a lateral force and* one or more data selected from the group: train identification, train acceleration, train deceleration, [rail stress,] temperature, precipitation, acceleration, distributed power identification, axle load, or a combination thereof.

8. The system of claim 7, wherein the track status data is transmitted to the data analyzing module via wire, or wirelessly.

9. The system of claim 7, wherein the data analyzing module comprises an out-put module.

10. The system of claim 9, wherein the out-put module displays data comprising lubrication status, lateral force distribution, comparison of curve design superelevation to optimal superelevation and/or actual superelevation, comparison of actual train speed to design train speed, axle load distribution, distributed power configuration, detected geometry shift or a combination thereof.

11. The system of claim 10, wherein the system communicates with a lubrication module based on data processed by the output module.

12. The system of claim 7, further comprising a lubrication module.

[13. A device for measuring track status data at a track site comprising, a measuring module comprising at least one sensor for measuring track status, and a module for transmitting the track status data to an analyzing module, wherein the track status data comprises one or more data selected from the group: train identification, train acceleration, train deceleration, rail stress, temperature, precipitation, acceleration, distributed power identification, axle load, or a combination thereof.]

[14. The device of claim 13, wherein the sensor comprises a L/V sensor, a load cell, an accelerometer, a microphone, a closed-circuit television, a thermometer or a combination thereof.]

15. A method for optimizing track performance comprising:

a) measuring one or more track status data at one or more *stationary* measurement sites [of the] *at a* track *section* during a train pass through the one or more *stationary* measurement sites;

b) *receiving data on territory and maintenance conditions for the track section;*

*c*) analyzing the one or more track status data *and analyzing the data on territory and maintenance conditions* against one or more baseline reference values to obtain a track status profile, wherein the baseline reference values comprises traffic distribution, and wherein the traffic distribution comprises speed, velocity, direction, axle load or a combination thereof; and

[c] *d*) adjusting an operating parameter, a track parameter, or both the operating and track parameters, based on the track status profile, to optimize the track's performance,

*wherein the track status data comprises a lateral force and one or more data selected from the group consisting of: a vertical force, a lateral/vertical force ratio, train identification, train speed, train acceleration, train deceleration, wheel/rail interface friction, track lubrication status, temperature, precipitation, acceleration, vibration, distributed power identification, axle load, and a combination thereof.*

16. The method of claim 15, wherein in the step of adjusting, the operating parameter, a track parameter, or both the operating and track parameters, comprises lowering lateral/vertical forces, modulating geometry of the track, modulating superelevation of the track, modulating lubrication status of the track, modulating train operating speed, modulating distributed power of the train, or a combination thereof.

[17. The method of claim 15, wherein the track status data comprises one or more data selected from the group consisting of: a lateral force, a vertical force, a lateral/vertical force ratio, train identification, train speed, train acceleration, train deceleration, rail stress, wheel/rail interface friction, track lubrication status, temperature, precipitation, acceleration, vibration, distributed power identification, axel load, and a combination thereof.]

18. The method of claim 15, wherein in the step of analyzing, the baseline reference values further comprises maximum speed, superelevation of a curve, lubrication of the rail, friction modification of the rail, or a combination thereof.

19. The method of claim 15, wherein the track is a curved track.

* * * * *